US012792963B2

(12) United States Patent
Berman et al.

(10) Patent No.: US 12,792,963 B2
(45) Date of Patent: Nov. 10, 2026

(54) ELECTRONIC DATA VERIFICATION USING ARTIFICIAL INTELLIGENCE

(71) Applicant: Stripe, LLC, San Francisco, CA (US)

(72) Inventors: Brendan Berman, San Francisco, CA (US); Richard Li, San Francisco, CA (US); Justin Liow, San Francisco, CA (US); Niamh Clarke, San Francisco, CA (US); Alex Rosenblatt, San Francisco, CA (US)

(73) Assignee: Stripe, LLC, San Francisco, CA (US)

(*) Notice: Subject to any disclaimer, the term of this patent is extended or adjusted under 35 U.S.C. 154(b) by 685 days.

(21) Appl. No.: 18/341,569

(22) Filed: Jun. 26, 2023

(65) Prior Publication Data

US 2024/0428131 A1 Dec. 26, 2024

(51) Int. Cl.

| | |
|---|---|
| ***G06N 20/00*** | (2019.01) |
| ***G06N 5/02*** | (2023.01) |
| ***G06N 5/022*** | (2023.01) |
| ***G06N 20/20*** | (2019.01) |

(52) U.S. Cl.

CPC ............... *G06N 20/00* (2019.01); *G06N 5/02* (2013.01); *G06N 5/022* (2013.01); *G06N 20/20* (2019.01)

(58) Field of Classification Search

CPC ........ G06N 20/00; G06N 20/10; G06N 20/20; G06N 5/00; G06N 5/02; G06N 5/022; G06N 5/025; G06N 5/04; G06N 3/042

See application file for complete search history.

(56) References Cited

U.S. PATENT DOCUMENTS

| | | | | |
|---|---|---|---|---|
| 2020/0320134 | A1* | 10/2020 | Beaver | G06F 18/2178 |
| 2020/0403945 | A1* | 12/2020 | Boxwell | G06N 3/004 |
| 2022/0022760 | A1* | 1/2022 | Salcido | G16H 10/20 |

* cited by examiner

*Primary Examiner* — Shane D Woolwine

(74) *Attorney, Agent, or Firm* — Foley & Lardner LLP

(57) ABSTRACT

A method comprises determining whether a decision can be determined for the request based on a current information available; when the decision can be determined, utilizing a first model to determine a set of questions corresponding to the request, the first model previously trained using training data comprising a set of questions associated with a set of requests; utilizing a second model to determine one or more predicted answers for the set of questions, the second model ingesting the set of questions determined by the first model and at least one attribute associated with the request to generate the one or more predicted answers; and utilizing a third model to determine the decision for the request.

20 Claims, 4 Drawing Sheets

ELECTRONIC DATA VERIFICATION USING ARTIFICIAL INTELLIGENCE

TECHNICAL FIELD

This application relates generally to generating, training, and operating computer models.

BACKGROUND

Electronic content verification may be necessary before an electronic process is executed. For instance, electronic verification of one or more documents may be necessary before certain actions are performed, such as a financial transaction or a transfer of funds. In another example, verification may be needed to "establish trust" between two computing infrastructures before they can communicate and transfer the data necessary to execute one or more protocols.

To create efficiencies, some conventional software solutions identify risky behavior, aggregate related data points, and allow human reviewers to manually review the data and identify possible risky behavior. Typically, human reviewers review the data and answer various pre-determined questions. Subsequently, the software solution may use a static algorithm to generate a score indicative of likely risk. Since the implementation of these conventional software solutions, various technical challenges have been identified. For instance, the above-described process is inefficient because many of the questions within the predetermined list of questions may not be applicable or relevant. However, human reviewers must answer those questions in their entirety in order for the software solution to identify potential risky behavior. Moreover, this process heavily relies on each reviewer's subjective skills and understanding of the data, which is highly inefficient and inconsistent among human reviewers.

SUMMARY

For the aforementioned reasons, there is a desire for methods and systems to provide a rapid and efficient analysis of pertinent characteristics of a request to verify data in order to identify potential risks. Also desired is an efficient mechanism to analyze the data by identifying which questions need to be asked and what answers can be provided.

Disclosed herein are methods and systems associated with an intelligent data verification platform that uses a suite of artificial intelligence (AI) models, each having multiple AI models trained for a particular purpose. Each AI model may predict a result that is then ingested by another AI model. For instance, one AI model can be trained to predict a list of questions that would ultimately result in an accurate identification of risk. Another AI model may then ingest the list of questions, review the data, and predict a suitable answer for each question. A third AI model may then ingest data predicted by the first two AI models and determine a risk associated with the request (e.g., within the underlying data). The intelligent data verification platform allows for human reviewers to work in tandem with a suite of AI models. Therefore, the intelligent data verification platform uses a paradigm in which humans and AI models can work together.

As discussed above, traditional risk detection methods rely heavily on human review and analysis of data, which can be time-consuming and error-prone. By leveraging AI, it is possible to automate the process of identifying potential fraud, for example, and to analyze large amounts of data in a fraction of the time it would take a human. While some AI-based risk detection systems use machine learning algorithms to analyze historical data and identify patterns and anomalies that may indicate fraudulent activity, the methods and systems discussed herein can use a suite of AI models that are working in tandem (sometimes adversely) to identify risk. Therefore, the methods and systems discussed herein can identify risk in a much more efficient manner when compared to conventional AI models.

The disclosed suite of AI models described herein can be trained on new data and adapt their detection capabilities over time. This allows the models to stay current with the latest data trends, avoid data drift, and identify new questions indicative of risk that may not have been identified by traditional methods (or even using the same suite of models at a different time).

The disclosed suite of AI models can process and analyze large amounts of data in real time, providing near-instant identification of potential questions to be answered. Moreover, the disclosed suite of AI models may also predict the answer to the questions that were predicted by a different AI model. This may allow organizations to quickly take action to prevent or minimize the impact of risk (e.g., fraudulent activity). Furthermore, AI-based systems can be integrated with other security systems, such as biometric authentication or network monitoring, to provide a comprehensive approach to fraud detection.

Using the suite of AI models described herein, data points can be analyzed and decisions can be efficiently and transparently made. While most AI models analyze data, they typically do not provide the transparency needed for a human to review the AI model's inner workings. For instance, when a conventional AI model determines that a set of data points indicate a risk, the AI model may, at best, provide some raw data regarding how the decision was made. In contrast, the suite of AI model described herein can reveal step-by-step data indicating which aspects of the data were questioned and analyzed and what the answers to those questions were that lead to a decision. As a result, a human system administrator can review how the suite of AI models' analysis culminated with the end result.

In an embodiment, a method may comprise receiving, by a system, a request; determining, by the system, whether a correct decision can be made for the request based on a current information available and a likelihood of success; in response to the determining, by the system, that the decision can be determined for the request based on the current information available, utilizing, by the system, a first model to determine a set of questions corresponding to the request, the first model previously trained using training data comprising a set of questions associated with a set of requests; utilizing, by the system, a second model to determine one or more predicted answers for the set of questions, the second model ingesting the set of questions determined by the first model and at least one attribute associated with the request to generate the one or more predicted answers; and in response to the determining the set of questions and the one or more predicted answers, utilizing, by the system, a third model to determine the decision for the request, wherein the third model receives the set of questions and the one or more predicted answers as inputs in determining the decision.

The method may further comprise re-training, by the system, at least one of the first model, the second model, or the third model, in accordance with an input associated with the decision.

The third model may ingest one or more predicted answers having a confidence score that satisfy a threshold.

The at least one question may be generated by the first model to an impact value of a feature corresponding to a category of the at least one question.

The method may further comprise displaying, by the system, the set of questions and at least one predicted answer.

When a confidence value of an answer is below a threshold, the system may transmit a corresponding question to a computing device of a reviewer.

The third model may determine the decision for the request based on the set of questions, the one or more predicted answers, and at least one answer received from the computing device as inputs in determining the decision.

The method may further comprise transmitting, by the system, the request to a computing device of an employee in response to determining that the decision cannot be determined based on the current information available.

In another embodiment, a system may comprise a computer-readable medium having a set of instructions, that when executed, cause a processor to: receive a request; determine whether a correct decision can be made for the request based on a current information available and a likelihood of success; in response to the determine that the decision can be determined for the request based on the current information available, utilizing, by the system, a first model to determine a set of questions corresponding to the request, the first model previously trained using training data comprising a set of questions associated with a set of requests; utilize a second model to determine one or more predicted answers for the set of questions, the second model ingesting the set of questions determined by the first model and at least one attribute associated with the request to generate the one or more predicted answers; and in response to the determining the set of questions and the one or more predicted answers, utilize a third model to determine the decision for the request, wherein the third model receives the set of questions and the one or more predicted answers as inputs in determining the decision.

The instructions may further cause the processor to retrain at least one of the first model, the second model, or the third model, in accordance with an input associated with the decision.

The third model may ingest one or more predicted answers having a confidence score that satisfy a threshold.

At least one question may be generated by the first model to an impact value of a feature corresponding to a category of the at least one question.

The set of instructions may further cause the processor to display the set of questions and at least one predicted answer.

When a confidence value of an answer is below a threshold, the system may transmit a corresponding question to a computing device of a reviewer.

The third model may determine the decision for the request based on the set of questions, the one or more predicted answers, and at least one answer received from the computing device as inputs in determining the decision.

The set of instructions may further cause the processor to transmit the request to a computing device of an employee in response to determining that the decision cannot be determined based on the current information available.

In another embodiment, a system may comprise a database configured to store a first model, a second model, and a third model; and a processor in communication with the database, the processor configured to receive a request; determine whether a correct decision can be made for the request based on a current information available and a likelihood of success; in response to the determine that the decision can be determined for the request based on the current information available, utilizing, by the system, a first model to determine a set of questions corresponding to the request, the first model previously trained using training data comprising a set of questions associated with a set of requests; utilize a second model to determine one or more predicted answers for the set of questions, the second model ingesting the set of questions determined by the first model and at least one attribute associated with the request to generate the one or more predicted answers; and in response to the determining the set of questions and the one or more predicted answers, utilize a third model to determine the decision for the request, wherein the third model receives the set of questions and the one or more predicted answers as inputs in determining the decision.

The processor may be further configured to re-train at least one of the first model, the second model, or the third model, in accordance with an input associated with the decision.

The third model may ingest one or more predicted answers having a confidence score that satisfy a threshold.

At least one question may be generated by the first model to an impact value of a feature corresponding to a category of the at least one question.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

DETAILED DESCRIPTION

Figure 1:
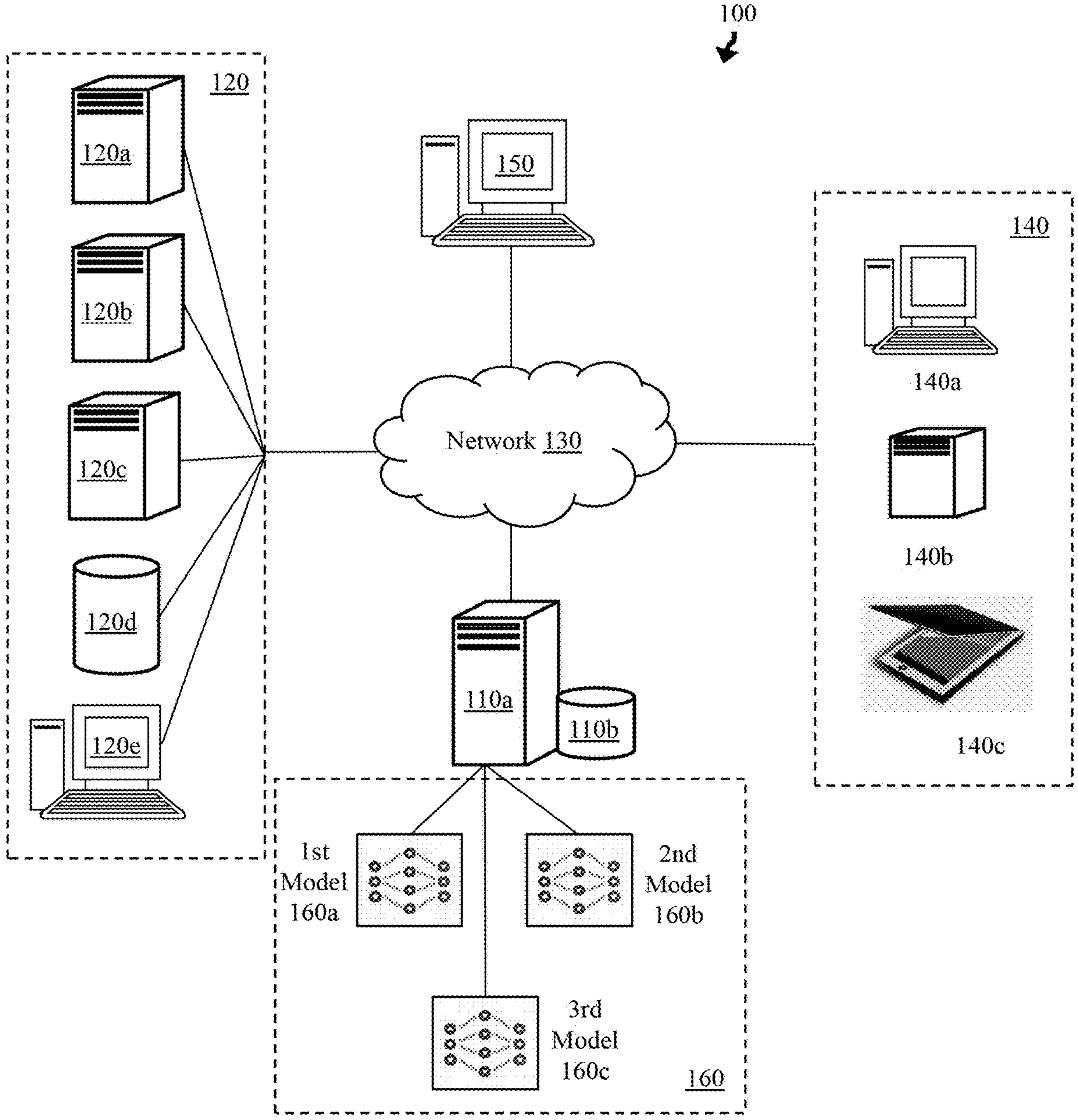
FIG. 1 illustrates various components of an intelligent data verification system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a non-limiting example of components of an intelligent data verification system 100 in which an analytics server 110*a* operates. The analytics server 110*a* may utilize features described in FIG. 1 to retrieve data and generate/display results, e.g., via a platform displayed on various devices. The analytics server 110*a* may be communicatively coupled to a system database 110*b*, electronic data sources 120*a-e* (collectively electronic data sources 120), user devices 140*a-c* (collectively user devices 140), and an administrator computing device 150. The analytics server 110*a* may also use various computer models (e.g., computer models 160*a-c*) to analyze the data.

The system 100 is not confined to the components described herein and may include additional or other components not shown for brevity, which are to be considered within the scope of the embodiments described herein.

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110*a* may generate and display an electronic platform (e.g., intelligent data verification platform that is sometimes referred to as a platform) on any device discussed herein. The platform may be configured to receive requests to verify data and output the results. For instance, the electronic platform may include one or more graphical user interfaces (GUIs) displayed on the user device 140 and/or the administrator computing device 150. An example of the platform generated and hosted by the analytics server 110*a* may be a web-based application or a website configured to be displayed on various electronic devices, such as mobile devices, tablets, personal computers, and the like. The platform may include various input elements configured to receive a response from any of the users and display any results necessary during execution of the methods discussed herein.

The analytics server 110*a* may be any computing device comprising a processor and non-transitory, machine-readable storage capable of executing the various tasks and processes described herein. The analytics server 110*a* may employ various processors such as a central processing unit (CPU) and graphics processing unit (GPU), among others. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The electronic data sources 120 may represent various electronic devices that receive, retrieve, and/or access data that can be used to train the AI models 160. The electronic data sources 120, as used herein, may represent any electronic device associated with an entity that has access to data that can be used to train any of the models discussed herein. Therefore, some of the electronic data sources 120 may be databases, servers, and/or computers associated with financial institutions, payment application, and other entities. The electronic data sources 120 may collect data associated with previous risk events (e.g., fraudulent transactions) where the data can be aggregated, and (pre) processed, and used to train the suite of AI models 160. Each electronic data source 120 may include one or more computing devices comprising a processor and non-transitory, machine-readable storage capable of executing the various tasks and processes needed to monitor and collect data. The electronic data sources 120 may also comprise other computing components than servers.

User devices 140 may be any computing device comprising a processor and a non-transitory, machine-readable storage medium capable of performing the various tasks and processes described herein. Non-limiting examples of a user device 140 may be a workstation computer, laptop computer, phone, tablet computer, and server computer. During operation, various users may use user devices 140 to access the platform operationally managed by the analytics server 110*a*. Even though referred to herein as "user" devices, these devices may not always be operated by users. For instance, a tablet 140*c* may be used by an employee or a merchant (or another person on behalf of a merchant), a loan applicant, a customer, or the like who can access the platform and manually review/answer various questions.

The administrator computing device 150 may represent a computing device operated by a system administrator. The administrator computing device 150 may be configured to monitor attributes generated by the analytics server 110*a* (e.g., a question predicted to be relevant to the request or a predicted answer to the predicted question); monitor one or more computer models 160*a-c*; review feedback; and/or facilitate training or retraining (calibration) of the computer models 160*a-c* that are maintained by the analytics server 110*a*. In some embodiments, the administrator computing device 150 can override the results generated by the analytics server 110*a*, e.g., generated via the computer models 160*a-c*. For instance, the administrator computing device 150 can manually add a question, a response, and/or eliminate any questions predicted/generated by the analytics server 110*a*.

The computer models 160*a-c* may be stored in the system database 110*b*. The computer models 160*a-c* may be trained using data received or retrieved from the platform, the electronic data sources 120, and/or other data sources. As described herein, the analytics server 110*a* may store the computer models 160*a-c* (e.g., neural networks, random forest, support vector machines, regression models, recurrent models, etc.) in an accessible data repository, such as the system database 110*b*.

Figure 2:
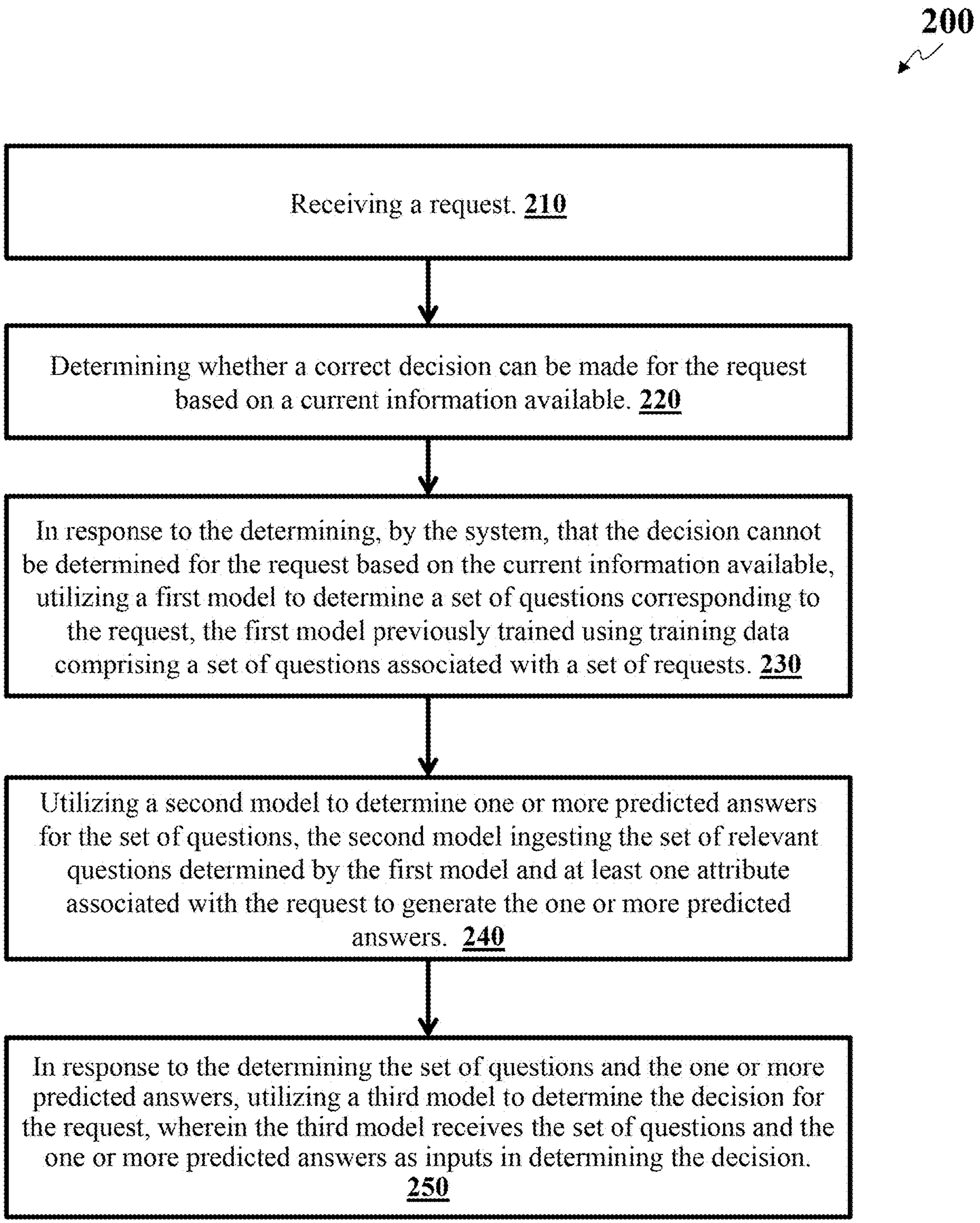
FIG. 2 illustrates a flow diagram of a process executed in an intelligent data verification system, according to an embodiment.

FIG. 2 illustrates a flow diagram of a process executed in an intelligent data verification system, according to an embodiment. The method 200 includes steps 210-250. However, other embodiments may include additional or alternative execution steps, or may omit one or more steps altogether. The method 200 is described as being executed by a server, similar to the analytics server described in FIG. 1. However, one or more steps of method 200 may also be executed by any number of computing devices operating in the distributed computing system described in FIG. 1. For instance, one or more computing devices (e.g., user devices) may locally perform part or all of the steps described in FIG. 2. Moreover, one or more of the steps of the method 200 can be performed via any processor of the system, such as any processor the system 100.

Using the methods and systems described herein, such as the method 200, the analytics server may identify various questions related to a received request. The analytics server may also predict answers to those questions. Using the predicted answers, the analytics server may assess the request and determine an answer, either in an automated manner or in conjunction with a human reviewer.

At step 210, the analytics server may receive, from a computing device, a request to verify data. The request, as used herein, may refer to a request to validate any type of data, e.g., data associated with a financial transaction, verify whether a transactions violates any rules, and/or verify a file uploaded by an end-user (e.g., proof of income document uploaded). The request may be received from a user, administrator, and/or generated automatically (e.g., received via a processor in an automated fashion). In some embodiments, the request may identify a transaction, include data associated with the transaction, and inquire whether the data can be verified, such that the transaction is ultimately approved or denied.

In a non-limiting example, a processor associated with an electronic payment application (system) may receive a financial transaction request. The processor may use various methods, such as using preprogrammed computer models to determine a risk associated with the request. For instance, the processor may analyze whether the amount of the transaction is correct, predict whether the party conducting the transaction is a bad actor or has fraudulently gained access to information necessary to conduct the transaction, and the like. In another example, the processor may use various methods to determine if the transaction violates any anti-money laundering laws. If the processor determines that the transaction has a confidence score satisfying a certain threshold, the processor may need to verify one or more data points associated with the transactions before it allows the electronic payment application to facilitate the transaction. As a result, the processor may generate and transmit a request to the analytics server, such that the analytics server can verify the data needed before the transaction is facilitated.

The request may also include one or more attributes of the data to be verified, how the data is to be verified, an indication of the data itself, and the like. In one example, the request may include an indication of the data to be verified (e.g., an indication of a data record, such as a social security number or a file uploaded or identified by the user) and an indication of which attribute is to be verified (e.g., social security number of the data record matching a user's known social security number, one or more aspects of an uploaded file's content matching what the user has purported them to be in a previously submitted form). In some embodiments, the request may also include an urgency value.

At step 220, the analytics server may determine whether a correct decision on the request can be made based on current information available, such as the data associated with the request and data that can be retrieved elsewhere. The analytics server may use various methods, such as algorithmic methods (e.g., predefined rules) and/or computer models trained via machine-learning methods to predict whether the request can be verified automatically.

In some embodiments, the analytics server may execute a verification computer model to identify a likelihood of successful verification of the data. The verification computer model may use a collection of algorithms including, but not limited to, machine-learning algorithms to determine whether the data to be verified should be transmitted to a human reviewer or can be verified using an automated method, such as the method 200. Accordingly, the verification computer model may analyze the data and determine a likelihood of successful verification.

The verification computer model may first review data associated with the request and the data, itself, to be verified to ensure that the data matches the formatting requirements of a service provider for verification. The verification model may analyze whether the current and existing data associated with the request is enough for an AI-backed decision. For instance, in some embodiments, the verification model may first determine if all the data points needed to make a decision are available to be analyzed. Additionally or alternatively, the verification model may determine a confidence score associated with the request where the confidence score corresponds to a likelihood of reaching a correct decision or (in the alternative) reaching an incorrect decision.

For instance, the verification computer model may determine whether the data has the correct formatting requirement (e.g., format that matches the request). In a non-limiting example, if the request is to verify an electronic document, the verification computer model may determine whether the data uploaded (e.g., to be verified) is in a format that is consistent with an electronic document. In another example, the verification computer model may determine whether the data is the correct length/size, matches the correct ID number of the request (e.g., document and request may be assigned an ID number based on an attribute of the request, such as a country of origin), was uploaded properly by the user, and the like.

The verification computer model may also perform internal fraud check protocols to determine (at least initially) whether the data includes fraudulent elements (e.g., whether a document is forged). For instance, the verification model may execute one or more data extraction protocols, such as optical character recognition (OCR) protocols, to identify the content of the data to be verified. Using the extracted data, the verification computer model may determine that the data to be verified might be fraudulent or include fraudulent elements. For instance, if the verification computer model identifies font inconsistencies in a document, the verification computer model may flag the document as potentially fraudulent and having a low likelihood of verification success.

The verification computer model may also analyze data associated with the request and/or the user to determine the likelihood of verification success. For instance, an IP address associated with a request may be analyzed to see if the IP address indicates potential fraud (e.g., IP address of the request does not correspond to the user's usual location or IP address). In another example, the verification computer model may analyze the user's verification history. If the user has previously submitted data that was rejected by a service provider (e.g., indicated as fraudulent, unverifiable, and/or incorrect), the verification computer model may assign a lower likelihood of verification success to the request.

In some embodiments, the analytics server may extract and analyze metadata to be verified in order to identify the likelihood of success. For instance, an uploaded document purporting to be a bank statement from Bank A may include metadata indicating that it was created by Bank B. Though probably not fraudulent, the document may receive a low likelihood of success. In another example, metadata associated with a document may indicate that the document was created at a time that is inconsistent with that which the document is purporting to illustrate.

In some embodiments, the analytics server may identify the likelihood of verification failure in accordance with historical verification data associated with the service providers. For instance, the analytics server may determine that, historically, the automated methods discussed herein are not highly effective when determining whether a transaction violates IRS regulations. Moreover, in some embodiments, the verification computer model may calculate the likelihood of success based on one or more attributes of the user.

At step 230 the analytics server may, in response to the determination that a decision on the request can be made based on the available information, utilize a first computer model to determine a set of questions corresponding to the request, the first model previously trained using training data comprising a set of questions associated with a set of requests.

Responsive to the likelihood of verification success (calculated in the step 220) satisfying a threshold, the analytics server may execute a first computer model to determine a one or more questions associated with the request. The analytics server may first analyze the likelihood of verification generated in the step 220. If the determined likelihood of success is satisfies a predetermined threshold, the analytics server may determine to transmit the request (along with its data) to a first computer model. If the determined likelihood does not satisfy the predetermined threshold, the request and the data to be verified may be transmitted to a computing device of a human reviewer where the data can be manually verified.

The threshold may correspond to a likelihood of success upon which the analytics server relies when determining whether to transmit the data to a human reviewer. The threshold may be expressed as a percentage or as a number within a scale, such as 0.0-1.0 or 0-100. The threshold may be determined and/or revised by a system administrator. The higher the threshold, the fewer data/requests may be sent to the first computer model (and the greater the requests to be handled manually). For instance, if the threshold is set to 80%, the analytics server may only transmit data to the first computer model if the data is more than 80% likely to be successfully verified.

When the request satisfies the threshold, the analytics server may execute a first computer model processing the attributes of the request along with any data to be verified. The first computer may then generate a set of questions to be evaluated. The one or more questions, as used herein, may refer to one or more questions necessary to be answered to satisfy the request. The questions and the order in which the questions are asked may be different, based on one or more attributes of the request itself and the data contained within the request. For instance, a request to verify a merchant's income that includes a PDF of the merchant's bank statement may be treated differently than a second request to determine whether a party to a transaction has ties to a company that has been sanctioned by the government and/or has been associated with money laundering in the past.

The first computer model may be a machine-learning model that has been trained using a training dataset comprising previously verified data or data procured for training purposes. The training dataset may include a set of requests and each request's attributes (e.g., a category of the request and/or type of data to be verified). The training dataset may also include questions necessary to be answered to provide a response to the request.

In a non-limiting example, the training dataset may include a request for transaction verification (e.g., determining whether the transaction violates any money-laundering rules/regulations). The request may correspond to requests that have been previously analyzed (e.g., historical requests) and/or requests that are generated for training purposes (e.g., training requests). As a result, the analytics server may generate a set of data records corresponding to the request. For instance, a data record may include the question presented. Another data record may include any files included within the request. Another data record may include data associated with the transaction itself (e.g., timestamp, IP address, amount, fiat, data associated with parties to the transaction, and the like). The analytics server may also retrieve a list of previously evaluated questions used to determine whether the transaction within the request was identified as potentially violating any money-laundering rules/regulations. For instance, the training dataset may include questions, such as "is a party of the transaction a citizen of a country sanctioned by the government?", "are any of the parties currently living in a country sanctioned by the government?", or "is the IP address associated with a country sanctioned by the government?" The training dataset may also include the result/outcome of the verification (e.g., success or failure).

In addition to the previously-verified requests, the training dataset may include rules and regulations (e.g., codified such that the first computer model can identify the rules) associated with the questions/requests. For instance, a rule may indicate a predetermined list of questions to be asked based on one or more attributes of the request. The training dataset may also include a predetermined list of questions relating to a category and/or containing certain key terms. For instance, the rule may indicate a list of questions to be answered (and their order) if the request is inquiring about money-laundering. In another example, another rule may indicate a list of questions (and their order) when the request includes the following key terms: fraud, imposter, and stolen credit card.

The analytics server may train the first computer model using various machine-learning algorithms (e.g., supervised, semi-supervised, or unsupervised). After the first computer model is trained, the second computer model may be configured to receive a request and predict a set of questions to be verified in order to determine a response to the request. The training may also include learning the order in which questions are to be presented.

In some embodiments, the questions may correspond to a category associated with features identified as more important when determining a decision for the request. The analytics server may perform various analytical steps to determine which features or categories of data should be prioritized over others. For instance, in some embodiments, the analytics server may use an impact value for a feature as an indicator that a particular feature should be prioritized over other features. In some embodiments, the analytics server may determine the impact of each data point and/or feature (e.g., a combination of data points) analyzed by the computer model 250. As used herein, an impact or an impact value may refer to the contribution of each data point, feature, and/or input variable to the model to the final prediction/outcome.

In some embodiments, the analytics server may use metrics, such as SHAPLEY values to determine an impact of an input variable, a data point, or a feature. Additionally or alternatively, the analytics server may use a predetermine list of categories and/or features to prioritized the generation of questions. For instance, a feature corresponding to a country of origin may have a high impact that is associated with a decision to a request regarding violation of money laundering laws. Accordingly, the feature may have a high impact value in determining the overall response to the question. As result, the country of origin (or any feature that corresponds to this attribute) may have a high impact value within the computer models (e.g., the computer model discussed in the step 250. Because this feature has a high impact value, the first computer model may generate one or more questions regarding the "county of origin," such as "where do the parties to the transaction reside?", when generating the set of questions.

In contrast, the amount of money transferred may not have a big impact on whether a transaction violates laws promulgated by the Office of Foreign Asset Control (OFAC). Accordingly, when generating questions to be evaluated for possible OFAC violations, the first computer model may not generate a question that inquires the transaction amount.

At step 240, the analytics server may utilize a second model to determine one or more predicted answers for the set of questions, the second model ingesting the set of relevant questions determined by the first model and at least one attribute associated with the request in order to generate the one or more predicted answers.

The analytics server may use a second computer model to predict answers for the questions predicted by the first computer model. The second computer model may use one or more attributes of the request and/or the data contained within the request to predict the answers. For instance, the second computer model may ingest the question predicted by the first computer model. The second computer model may then ingest the request and any additional data associated with the request. The second computer model may then predict an answer for each question that was predicted.

The second computer model may also predict a confidence score for each response. The confidence score for a prediction may refer to a numerical representation of the second computer model's belief in the accuracy of its prediction (e.g., a predicted response to the predicted answer). The confidence score may range from 0.0 to 1.0, with a higher score indicating a higher degree of confidence. Confidence scores can be used to evaluate the performance of the second computer model or to determine which response to use. For instance, in some embodiments, the analytics server may only accept responses generated by the second computer model if they have a confidence score that satisfies a certain threshold.

The second computer model may be a machine-learning model that has been trained using a training dataset comprising previous data verified or data procured for training purposes. The training dataset may include a set of requests and each request's attributes (e.g., a category of the request and/or type of data to be verified). The training dataset may also include questions that needed to be answered to provide a response to the request within the training dataset. Additional to the dataset used to train the first computer model, the second computer model may be trained using a training dataset that also includes answers to the training dataset's questions.

In addition to the previously-verified requests, the training dataset may include rules and regulations (e.g., codified such that the first computer model can identify the rules) associated with the answers. For instance, the training dataset may include a predetermined list of data sources for different answers and/or algorithmic methods of identifying the correct answer that relate to a category and/or certain key terms within the request and/or different questions.

Using the training dataset generated for the second computer model, the analytics server may train the second computer model using various machine-learning techniques. In some embodiments, the analytics server may generate one training dataset that includes requests (and relevant data associated with requests), questions considered, and the identified answers. The analytics server may then train the first computer model and the second computer model using the same training data. However, the first computer model may be trained to predict answers, and the second computer model may be trained to predict answers.

In some embodiments, the analytics server may train the first and second computer models adversarially. Accordingly, the first and second computer models may adversarially identify questions and answers. In those embodiments, the first computer model may be a generator and the second computer model may be a discriminator. Both models may be trained together in a competition. For instance, the first computer model may generate questions and the second computer model may predict an answer for the identified questions. Over time and given enough iterations, the second computer model may improve itself (by increasing its confidence score for questions predicted by the first computer model). Therefore, the two computer models may continuously improve.

A system administrator (or a human reviewer) may periodically monitor how the first and/or the second computer models are being trained. Using manual reviewers, the system administrator may calibrate the training. For instance, in some embodiments, at least a portion of the training may occur in a supervised manner in which the correct answer is labeled within the training dataset.

Using its training and data associated with the request, the second computer model may predict an answer for each of the questions generated by the first computer model. In some embodiments, the second computer model may execute one or more analytical protocols to analyze the request's data. For instance, the second computer model may execute an OCR protocol or other protocols (e.g., AI protocols that visually inspect a document) to determine if the data matches a verification type requested by the user. For instance, an OCR protocol may identify data that indicates that an uploaded document is a bank statement. As a result, the analytics server may determine that the uploaded document is an appropriate document for verifying whether a merchant has dealings with countries that have been sanctioned by a government. However, in another example, if the OCR protocol reveals that the uploaded document is a marketing brochure, the first computer model may determine that the question cannot be answered using the existing data. As a result, the response may receive a low confidence score and/or the second computer model may indicate that the question requires transmission to an employee for further manual review.

When the questions have been predicted and the answers to at least some of the questions have been predicted, the analytics server may analyze the request (using the answers) to determine whether the request can be satisfied. For instance, if the request is regarding verification of a document, the analytics serve may determine a percentage of the questions having been answered by the second computer model and their confidence score. The analytics server may then use the predicted answers to determine a response to the request (e.g., whether the document can be verified. If the answers (generated by the second model) have a high confidence score (e.g., exceed a predetermined threshold), the analytics server may use the answers and execute various algorithms to determine the response to the request. If one or more answers predicted by the second computer model do not have a confidence score satisfying a threshold, the analytics server may display the one or more questions on a platform, such that a human reviewer can input a response. When the human reviewer responses are received, the analytics server may then determine a response to the request.

The response to a request may be transmitted back to the processor that transmitted the request to the analytics server (e.g., an employee's computer or another server) where the response itself can be evaluated, accepted, rejected, revised, and/or overridden, if needed. The action ultimately performed can then be fed back to the analytics server, such that the analytics server can calibrate one or more computer models accordingly. For instance, if an answer predicted by the second computer model is flagged as incorrect (and the overall response to the request is rejected or revised), the analytics server may recalibrate the second computer model. In another example, if the overall response is identified as incorrect, the analytics server may recalibrate the verification model, such that similar requests are not evaluated using the method 200 and are instead transmitted to human reviewers.

At step 250, the analytics server may, in response to the determining the set of questions and the one or more predicted answers, utilize a third model to determine the decision for the request, wherein the third model receives the set of questions and the one or more predicted answers as inputs in determining the decision. The analytics server may train a third model using training dataset comprising previously considered requests and their corresponding data (e.g., previous requests, questions to be evaluated, and responses to the questions) in addition to codified rules and predetermined decision protocols. The third model may ingest the questions predicted, responses predicted for the questions (and when applicable, response received from human reviewers) and determine a response to the received request.

In some embodiments, the third model may only consider responses with a confidence value that satisfies a threshold. In some embodiments, the analytics server may only transmit questions to be answered for which the second computer cannot respond (with a particular confidence score). Therefore, the analytics server may reduce the workload for manual reviewers. In using the responses, the third model may use the responses generated by the second model and/or responses inputted by a human reviewer.

In some embodiments, the third model may comprise a series of preprogrammed rules that analyze the responses (either predicted by the second model or inputted by a human reviewer).

In some embodiments, the analytics server may display all the questions and their corresponding response (and optionally confidence scores) on a dashboard/platform. In this way, a system administrator can easily identify what questions were posed and how those questions were responded to that resulted in the overall decision made by the analytics server. Accordingly, using this method, the analytics server can provide transparency to the decision in a manner that is easily understandable and identifiable to users and system administrators.

Figure 3:
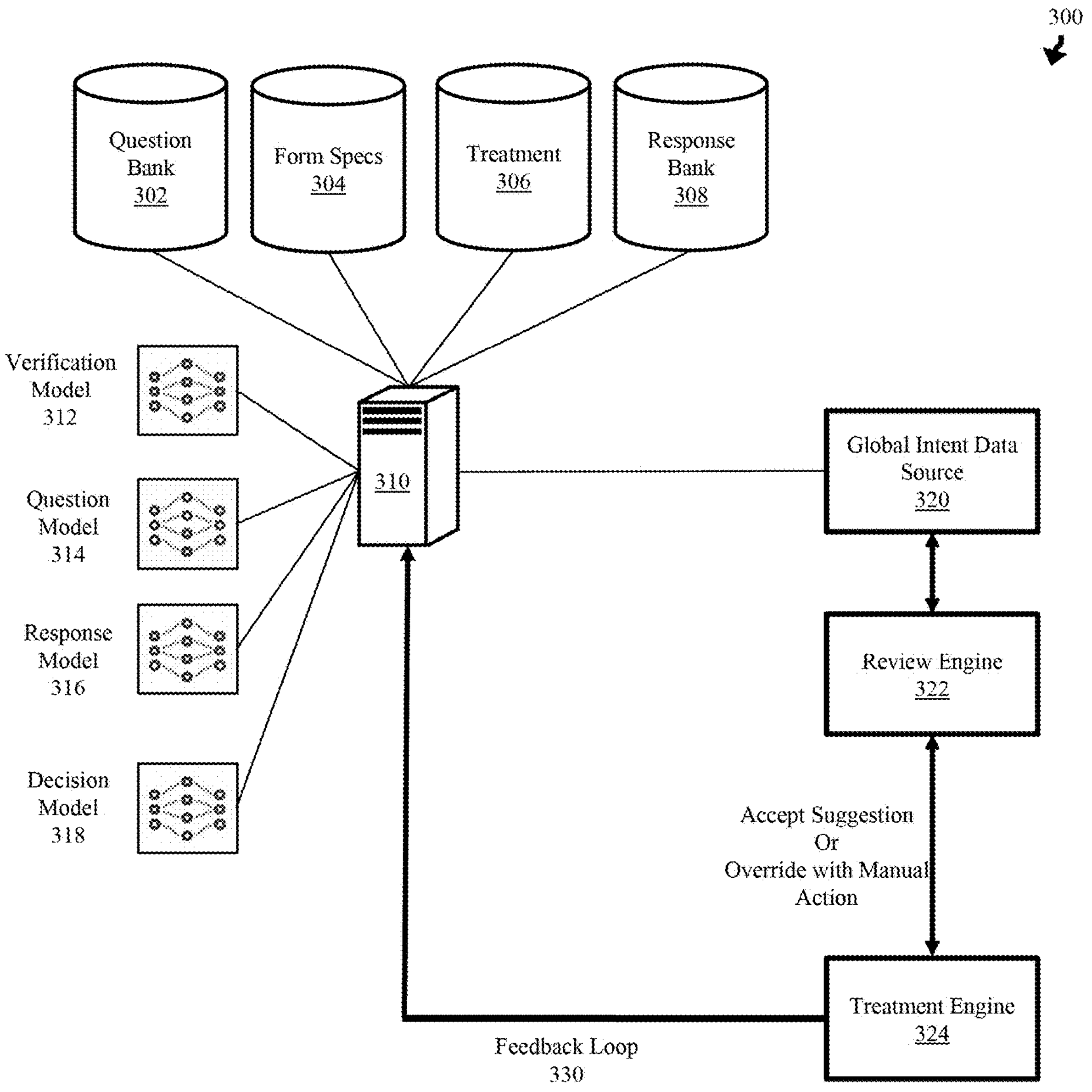
FIG. 3 illustrates a flow diagram of a process executed in an intelligent data verification system, according to an embodiment.

Referring now to FIG. 3, a method 300 illustrates a flow diagram of a process executed in an intelligent data verification platform, according to an embodiment. The method 300 is a non-limiting example of execution and implementation of the methods and systems discussed herein, including the method 200.

In method 300, a server 310, such as the analytics server discussed in FIG. 1, may train three models (verification model 312, question model 314, and response model 316) using data collected from various data sources (e.g., 302-308). An electronic payment system may periodically collect data associated with ongoing/previous requests, aggregate and preprocess the collected data, and populate various databases accordingly. Specifically, the system may populate a question bank 302 with questions used to evaluate the requests, and then populate the response bank 308 using the responses to those questions within the question bank 302. The system may also aggregate any other information, specifications, templates, or rules needed to analyze the requests and store them within form specs 304. Moreover, the system may aggregate and store the responses to the requests (e.g., rejected or accepted) in treatment 306.

The server 310 may use the data stored within databases 302-308 to train the verification model 312, question model 314, and the response model 316. After training and validation, the verification model 312 may be configured to predict whether executing an automated verification method, such as method 200, would result in an acceptable and appropriate response. The question model 314 may be configured to generate questions after ingesting data associated with a new request. Moreover, the response model 316 may be trained to ingest questions predicted by question model 314 and predict answers using data associated with the new request (and in accordance with its training based on previous requests).

Upon receiving a new request, the server 310 may retrieve data associated with the request using a global intent data source 320. The global intent data source 320 may be any data source (e.g., database or an application programming interface associated with an electronic payment system) that includes payment flow information and other information associated with the request. For instance, if the request is associated with a transaction, the global intent data source 320 may include data associated with the transaction (e.g., amount, parties, timestamp, IP address, and other raw data, in addition to data that has been analyzed and processed by the electronic payment system).

The server 310 may then use the data associated with the new request to execute the models discussed herein and generate a set of questions and their answers. Using the methods and systems discussed herein, the server 310 may generate a decision (e.g., by executing the decision model discussed in the step 250 in FIG. 2) to the request and transmit the decision to the review engine 322, where the review engine 322 can accept, reject, and/or revise the decision regarding the request. In some embodiments, the review engine 322 may transmit one or more questions and/or response generated/predicted using the methods discussed herein to a human reviewer. The output of the review engine 322 may be ingested by the treatment engine 324 that can take an action based on the decision made by the server 310 and/or the review engine 322. For instance, the treatment engine 324 may facilitate a transaction because the server 310 predicts, using the methods and systems discussed herein, that the transaction is not risky.

Figure 4:
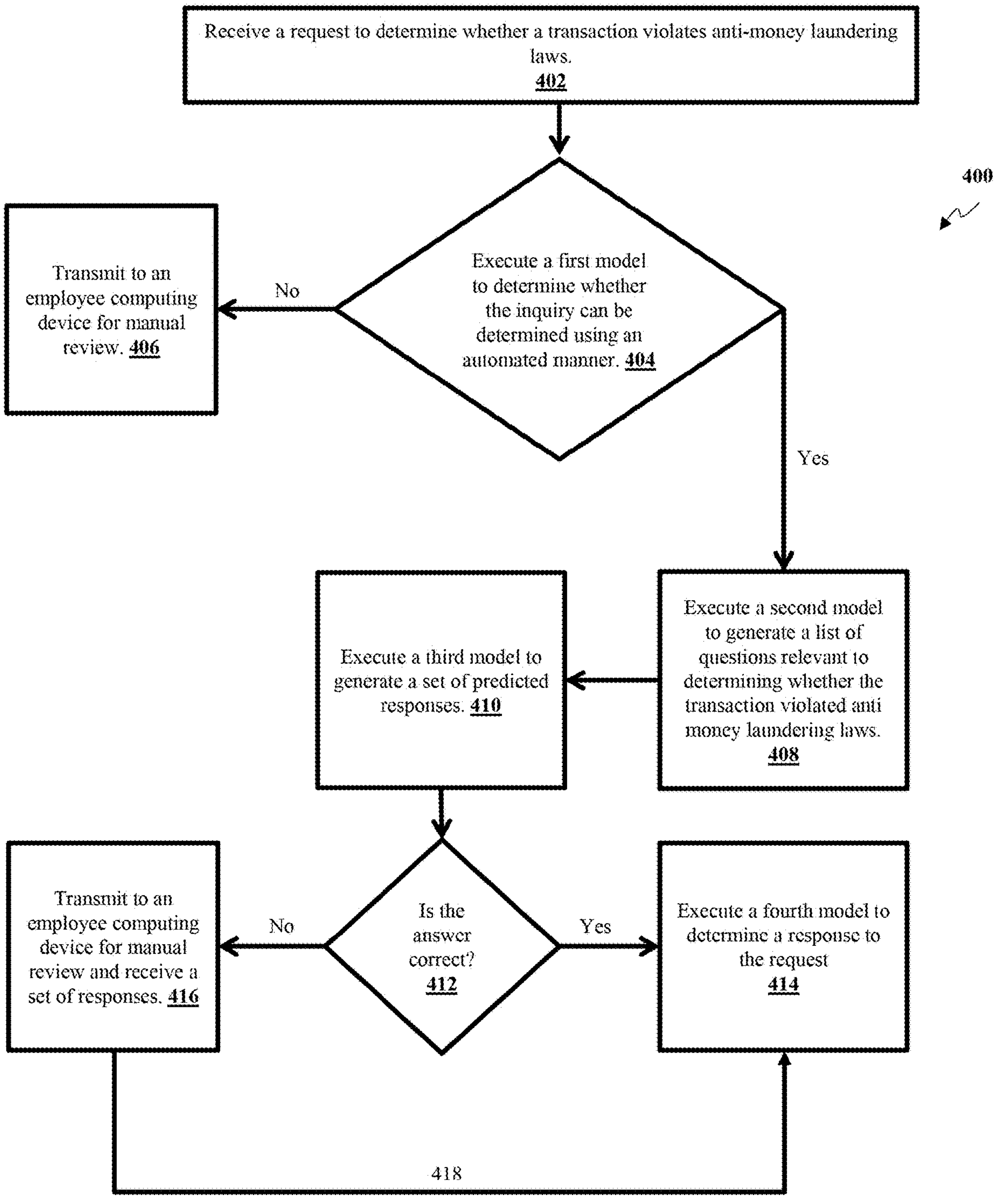
FIG. 4 illustrates a flow diagram of a process executed in an intelligent data verification system, according to an embodiment.

Referring now to FIG. 4, a method 400 is illustrated by a flow diagram of a process executed in an intelligent data verification platform, according to an embodiment. Method 400 is a non-limiting example of execution and implementation of the methods and systems discussed herein, including method 200.

At step 402, an analytics server receives a request from another server (e.g., a server associated with an electronic payment system). The request indicates a pending transaction and inquires whether the transaction violates any anti-money laundering laws. The analytics server may first gather data associated with the transaction (e.g., transaction data and demographics, various documents associated with the transaction that were uploaded by a party to the transaction, and the like). At step 404, the analytics server may execute a first model to determine a likelihood that the request (and the inquiry) can be answered using an automated and intelligent manner (e.g., method 200). If the likelihood satisfies a certain threshold (e.g., there is a high likelihood that the analytics server can use the models discussed herein to provide a decision or a response to the request), the analytics server may move to step 408. If not, the analytics server may move to the step 406, where the request is transmitted to an employee for manual review.

At step 408, the analytics server may execute a second model to generate a list of questions relevant to determining whether the transaction violates any laws. The analytics server may then execute a third model to generate a set of predicted answers for the predicted questions (step 410). The analytics server may analyze the questions and their corresponding answers (e.g., based on their respective confidence scores) to determine whether the answer is correct (step 412). If the answers are correct (yes branch), the analytics server may execute a fourth model to determine whether the answers indicate the transaction violates anti-money laundering laws (step 414). If the answers are not correct, the analytics server transmits the questions and/or answers to a human reviewer for manual analysis (step 416). As a result of manual review, an employee may input responses to the questions. The analytics server may then move to the step 414 using the responses received (branch 418). In the step 414, the analytics server may execute a fourth model determine a decision for the request.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method of executing a suite of artificial intelligence models to modify states of electronic data verification operations, the method comprising:

receiving, by a system, a request associated with an electronic data verification operation executed over a communications network;

determining, by the system, whether a decision can be made for the request based on current information available and a likelihood of success;

subsequent to determining, by the system, that the decision can be made for the request based on the current information available, utilizing, by the system, a first model to generate a set of questions corresponding to the request, the first model previously trained using training data comprising a set of training questions associated with a set of training requests, wherein the first model generates the set of questions based on generating feature importance scores associated with attributes of the request;

utilizing, by the system, a second model to determine one or more predicted answers for the set of questions, the second model ingesting the set of questions generated by the first model and at least one attribute associated with the request to generate the one or more predicted answers;

subsequent to generating the set of questions and determining the one or more predicted answers, utilizing, by the system, a third model to determine the decision for the request, wherein the third model receives the set of questions and the one or more predicted answers as inputs in determining the decision; and causing, by the system, an automated action to be performed over the communications network based on the decision, wherein the automated action modifies a state of the electronic data verification operation associated with the request.

2. The method of claim 1, further comprising:

receiving, by the system, an evaluation of the decision comprising at least one of an acceptance, rejection, revision, or override; and re-training, by the system, at least one of the first model, the second model, or the third model, based on the evaluation.

3. The method of claim 1, wherein the third model ingests a subset of the one or more predicted answers having a confidence score that satisfies a threshold.

4. The method of claim 1, wherein at least one question is generated by the first model according to an impact value of a feature corresponding to a category of the at least one question.

5. The method of claim 1, further comprising:

displaying, by the system, the set of questions and at least one predicted answer.

6. The method of claim 1, wherein when a confidence score of an answer is below a threshold, the system transmits a corresponding question to a computing device of a reviewer.

7. The method of claim 6, wherein the third model determines the decision for the request based on the set of questions, the one or more predicted answers, and at least one answer received from the computing device as inputs in determining the decision.

8. The method of claim 1, further comprising:

transmitting, by the system, the request to a computing device of an employee subsequent to determining that the decision cannot be made based on the current information available.

9. A system comprising:

a computer-readable medium having a set of instructions, that when executed, cause a processor to:

receive a request associated with an electronic data verification operation executed over a communications network;

determine whether a decision can be made for the request based on current information available and a likelihood of success;

subsequent to determining that the decision can be made for the request based on the current information available, utilize a first model to generate a set of questions corresponding to the request, the first model previously trained using training data comprising a set of training questions associated with a set of training requests, wherein the first model generates the set of questions based on generating feature importance scores associated with attributes of the request;

utilize a second model to determine one or more predicted answers for the set of questions, the second model ingesting the set of questions generated by the first model and at least one attribute associated with the request to generate the one or more predicted answers;

subsequent to generating the set of questions and determining the one or more predicted answers, utilize a third model to determine the decision for the request, wherein the third model receives the set of questions and the one or more predicted answers as inputs in determining the decision; and cause an automated action to be performed over the communications network based on the decision, wherein the automated action modifies a state of the electronic data verification operation associated with the request.

10. The system of claim 9, wherein the set of instructions further cause the processor to:

receive an evaluation of the decision comprising at least one of an acceptance, rejection, revision, or override; and re-train at least one of the first model, the second model, or the third model, based on the evaluation.

11. The system of claim 9, wherein the third model ingests a subset of the one or more predicted answers having a confidence score that satisfies a threshold.

12. The system of claim 9, wherein at least one question is generated by the first model according to an impact value of a feature corresponding to a category of the at least one question.

13. The system of claim 9, wherein the set of instructions further cause the processor to:

display the set of questions and at least one predicted answer.

14. The system of claim 9, wherein when a confidence score of an answer is below a threshold, the system transmits a corresponding question to a computing device of a reviewer.

15. The system of claim 14, wherein the third model determines the decision for the request based on the set of questions, the one or more predicted answers, and at least one answer received from the computing device as inputs in determining the decision.

16. The system of claim 9, wherein the set of instructions further cause the processor to:

transmit the request to a computing device of an employee subsequent to determining that the decision cannot be made based on the current information available.

17. A system comprising:

a database configured to store a first model, a second model, and a third model; and a processor in communication with the database, the processor configured to:

receive a request associated with an electronic data verification operation executed over a communications network;

determine whether a decision can be made for the request based on current information available and a likelihood of success;

subsequent to determining that the decision can be made for the request based on the current information available, utilize the first model to generate a set of questions corresponding to the request, the first model previously trained using training data comprising a set of training questions associated with a set of training requests, wherein the first model generates the set of questions based on generating feature importance scores associated with attributes of the request;

utilize the second model to determine one or more predicted answers for the set of questions, the second model ingesting the set of questions generated by the first model and at least one attribute associated with the request to generate the one or more predicted answers;

subsequent to generating the set of questions and determining the one or more predicted answers, utilize the third model to determine the decision for the request, wherein the third model receives the set of questions and the one or more predicted answers as inputs in determining the decision; and cause an automated action to be performed over the communications network based on the decision, wherein the automated action modifies a state of the electronic data verification operation associated with the request.

18. The system of claim 17, wherein the processor is further configured to:

receive an evaluation of the decision comprising at least one of an acceptance, rejection, revision, or override; and re-train at least one of the first model, the second model, or the third model, based on the evaluation.

19. The system of claim 17, wherein the third model ingests a subset of the one or more predicted answers having a confidence score that satisfies a threshold.

20. The system of claim 17, wherein at least one question is generated by the first model according to an impact value of a feature corresponding to a category of the at least one question.

* * * * *